United States Patent [19]

Shropshire et al.

[11] 4,125,680
[45] Nov. 14, 1978

[54] BIPOLAR CARBON-PLASTIC ELECTRODE STRUCTURE-CONTAINING MULTICELL ELECTROCHEMICAL DEVICE AND METHOD OF MAKING SAME

[75] Inventors: Joseph A. Shropshire, Westfield; Hsue C. Tsien, Livingston, both of N.J.

[73] Assignee: Exxon Research & Engineering Co., Linden, N.J.

[21] Appl. No.: 825,605

[22] Filed: Aug. 18, 1977

[51] Int. Cl.$^2$ ............................................. H01M 6/48
[52] U.S. Cl. ........................................ 429/4; 429/154; 429/210
[58] Field of Search ............................. 429/149–155, 429/162, 163, 174, 185, 210, 4

[56] References Cited

U.S. PATENT DOCUMENTS

| 2,418,442 | 4/1947 | Wiencke | 429/155 |
| 2,496,709 | 2/1950 | Gelardin | 429/155 |
| 2,521,800 | 9/1950 | Martinez et al. | 429/155 |
| 2,526,789 | 10/1950 | Woodring | 429/155 |
| 3,770,505 | 11/1973 | Bergum et al. | 429/210 |
| 3,775,189 | 11/1973 | Jaggard | 264/23 X |
| 3,941,615 | 3/1976 | McDowall | 429/149 |

Primary Examiner—Anthony Skapars
Attorney, Agent, or Firm—Kenneth P. Glynn

[57] ABSTRACT

A novel multicell electrochemical device having a plurality of bipolar carbon-plastic electrode structures and a novel method of making the device are described. A plurality of bipolar carbon-plastic electrode structures are formed by first molding thin conductive carbon-plastic sheets from heated mixtures of specified carbon and plastic, and then establishing frames of dielectric plastic material around the sheets and sealing the frames to the sheets so as to render the resulting structures liquid impermeable. A plurality of electrochemical cell elements in addition to the electrode structures, e.g. separators, spacers and the like, are also formed with dielectric plastic frames. The frames of both the electrode structures and the additional elements have projections on at least one surface. The electrode structures and the additional elements are stacked to form a group of items in an electrochemically functional arrangement. The arrangement is such that the projection of each frame contacts a frame surface of the next item in the stack. The items in the stack are joined to one another, e.g. by heat welding or ultrasonic welding, at these areas of contact so as to form a multicell electrochemical device capable of holding liquid therein.

7 Claims, 10 Drawing Figures

BIPOLAR CARBON-PLASTIC ELECTRODE STRUCTURE-CONTAINING MULTICELL ELECTROCHEMICAL DEVICE AND METHOD OF MAKING SAME

BACKGROUND OF THE INVENTION

1. Field of the Invention

This invention relates to electrochemical devices and to methods of making them. More particularly, this invention is directed to a novel multicell electrochemical device having a plurality of bipolar carbon-plastic electrode structures and a novel method of making the device.

Numerous configurations for electrochemical devices have been developed over the years along with particular methods of making these devices to satisfy various electrical requirements and physical limitations on systems which use the devices. Recently, the need for more efficient automobile and vehicular battery and power systems has become apparent. The long used conventional lead/acid battery has become the object of much modification and development. Thus, for example, a new generation of lead/acid "life of the car", maintenance-free batteries has emerged. Nonetheless, in this era of energy conservation, of trimming the weight from conventional vehicles, of developing high energy density cell electric vehicles, and of using both novel means and conventional means to produce and to store energy in efficient manners, the need for an easily fabricated, lightweight multicell electrochemical device has become acute. The present invention is directed to satisfying this need.

2. Description of the Prior Art

In the past, the development of electrode structures for electrochemical cells involved the use of plastic for some parts of the electrodes, and this was, at least in part, successful. For example, U.S. Pat. No. 2,496,709 (Gelardin) describes a duplex electrode formed of a metal plate with various types of plastic and carbon plastic coatings thereon, around which a plastic frame is injection molded. Electrolyte compositions and other materials are added and stacks of these composited duplex electrodes are snapped together in a locking interengagement. Unfortunately, the reference discloses devices and techniques involving the use of heavy, expensive metal plates in the electrodes. U.S. Pat. No. 3,901,731 (Warszawski et al.), and the patents cited therein describe forming a framed electrode by molding a plastic frame around a preformed electrode. U.S. Pat. Nos. 2,416,576 (Franz et al.) and 2,966,538 (Bernot) describe stacked components of cells enclosed in plastic cups forming frame-like structures wherein the plastic parts may be sealed by heat welding or high frequency welding. However, these devices involve the stacking of a number of layers, including electrolyte and zinc metal anode, prior to fabrication and sealing of the finished cup structure. U.S. Pat. No. 3,775,189 (Jaggard) discloses the fabrication of an electrochemical cell involving the use of plastics, heat welding, and ultrasonic welding, including encapsulation of edges of certain electrode structures. The patent also teaches the use of melt beads or protusions to enhance ultrasonic welding. However, this patent is directed to the formation of single cells and bicells (cells having one anode and two cathodes), and is not directed to the fabrication of devices having a multiplicity of cells. U.S. Pat. No. 3,941,615 (McDowall) describes a tongue and groove joining means for adjacent plastic elements in a lead-acid battery system and is representative of one state of the art development.

Notwithstanding the many developments in the art of electrochemical device design and fabrication, as represented by the prior art cited above, due to the shortcomings in these developments, the need for easily fabricated, lightweight, multicell electrochemical devices and enhanced fabrication techniques still exists. None of the prior art disclosures teach or suggest the electrochemical device and fabrication technique of the present invention which satisfies this need.

SUMMARY OF THE INVENTION

The present invention is directed to a novel multicell electrochemical device having a plurality of bipolar carbon-plastic electrode structures and to a novel method of making the device. A plurality of bipolar carbon-plastic electrode structures are formed by first molding thin conductive carbon-plastic sheets from heated mixtures of specified carbon and plastic, and then establishing frames of dielectric plastic material around the sheets and sealing the frames to the sheets so as to render the resulting structures liquid impermeable. A plurality of electrochemical cell elements in addition to the electrode structures, e.g., separators, spacers, and the like, may also be formed with dielectric plastic frames. The frames of both the electrode structures and the additional elements have projections on at least one surface. The electrode structures and the additional elements are stacked to form a group of items in an electrochemically functional arrangement. The arrangement is such that the projection of each frame contacts a frame surface of the next item in the stack. The items in the stack are joined to one another, e.g. by heat welding or ultrasonic welding, at these areas of contact so as to form a multicell electrochemical device capable of holding liquid therein.

DETAILED DESCRIPTION OF THE INVENTION

The present invention includes a novel bipolar carbon-plastic electrode structure-containing electrochemical device and a novel method of making the device. The electrochemical device contains a plurality of the bipolar carbon-plastic electrode structures and a plurality of electrochemical cell elements. Each of the electrode structures are circumscribed by a dielectric plastic frame having a front surface and a back surface, at least one of these surfaces containing a projection thereon. Each of the electrode structures and cell elements are situated in a stacked arrangement with one another so as to form a group of items in an electrochemical cell-functional arrangement. This arrangement is such that the projection of the frame of each item contacts a frame surface of the next item in the stack. Each of the items is joined to the next item in the stack by being sealed where each projection contacts the frame surface of the next item, the items being sealed so as to form a multicell electrochemical device capable of holding liquid therein.

In the present invention, the method of making the multicell electrochemical device involves the formation of a plurality of bipolar carbon-plastic electrode structures. These electrode structures are each formed by molding a thin conductive carbon-plastic electrode sheet, establishing a frame of dielectric plastic material around the sheet, and sealing the frame to the sheet.

The thin conductive carbon-plastic electrode sheet is molded from a mixture containing particulate conductive carbon and plastic material. The particulate carbon material used in this mixture is one having a particle size, in general, in the range of about 10 millimicrons to about 100 microns. Desirably, the particulate carbon material is within the size range of about 10 millimicrons to about 100 millimicrons and preferred is particulate conductive carbon within the size range of about 20 to 40 millimicrons. The particulate conductive carbon may be any of the electrically conductive type carbon particles such as graphite and carbon black. Two types of carbon blacks which are particularly suitable because of the ease with which they may be compounded or mixed with various plastic materials are those which are known by the trademarks "Ketjenblack EC" (sold by Noury Chemical Corp. of Burt, New York,) and Cabot "Vulcan XC-72" (sold by Cabot Corp. of Boston, Mass.). Other commercially available graphite and carbon black products may be used as will be recognized by the artisan.

The plastic material used in the mixture may be a thermoplastic or a thermoset material or may be a high polymer. It may be loaded with filler materials and may contain other physical property enhancing additives. Thus, fillers such as minerals, asbestos, glass fibers, extenders, plasticizers, flame retardants, etc., may be included. Examples of suitable plastic materials are electrical grades of phenolformaldehyde resins, polyacrylic resins such as polymethylmethacrylate, polyvinyl resins such as polystyrene and polyvinyl chloride and polyolefins such as polyethylene, polypropylene and mixtures thereof. There may also be used mixtures of thermoplastic and thermoset resins such as various styrene copolymers and the products obtained by the use of such mixtures as phenol-formaldehyde condensation products with polyvinyl chloride. Thus, the term "plastic material" as used herein shall be taken to mean the foregoing plastics alone when used alone to made the conductive carbon-plastic materials of the present invention, and to mean these plastics with any of the foregoing additives in those instances in which the additives are to be included in making the conductive carbon-plastic materials of the present invention.

The thin conductive carbon-plastic sheet is molded from a mixture of the mentioned particulate conductive carbon and plastic material. Any known mixing and molding technique may be used, e.g., hot press molding or extrusion molding, as will be apparent to the artisan. In general, the mixture may contain about 10% to about 50% particulate conductive carbon and about 90% to about 50% plastic material based on the total weight of the particulate conductive carbon and the plastic material. Thus, the relative amounts of particulate conductive carbon and plastic material which may be employed cover a broad range in terms of amounts by weight. However, in general, sufficient particulate conductive carbon should be used so as to achieve an electrical conductivity level in the conductive carbon-plastic sheet of at least about 0.1 mho-cm. Desirable, sufficient particulate conductive carbon is employed so as to achieve an electrical conductivity of at least about 1 mho-cm. and preferably at least about 5 mho-cm. It is appropriate to define the amount of particulate conductive carbon to be employed in terms of minimum electrical conductivity levels because amounts by weight may vary with the particular carbon black material used in order to obtain a specified electrode operability, i.e. to obtain a desired conductivity level. For example, using "Ketjenblack EC", desired electrical conductivity levels may be obtained by using about 15 to about 25% by weight of the carbon black with about 85 to about 75% by weight of the plastic material. On the other hand, when "Vulcan XC-72" is employed, about 40 to about 50% by weight of the carbon and about 60 to about 50% by weight of the plastic material is needed to achieve the same conductivity levels.

The mixture containing the particulate conductive carbon and the plastic material is, as mentioned, molded into a thin conductive carbon-plastic electrode sheet and this sheet is bipolar in nature. The molding is achieved by known molding techniques and involves the application of heat to render the mixture moldable. The temperature to which the mixture is brought during molding is not critical as long as it renders the mixture moldable yet does not permanently damage the plastic material.

After the thin conductive carbon-plastic electrode sheet has been molded, a dielectric plastic frame is established around the sheet and the frame is sealed to the sheet. The dielectric frame may be made of any of the plastic materials mentioned above for molding the electrode sheets. In general, the dielectric plastic frame may be made of the same or of different plastic material from that used to form the thin sheet, although it is desirable that they be the same. For example, polyolefin may advantageously be used in both the thin sheet and in the frame, especially polyethylene-polypropylene mixtures. The frame is established around the thin sheet so as to have inner borders defining an open central area into which the sheet is disposed. The frame is also established so as to have a front surface and a back surface wherein at least one of these surfaces has a projection formed on it. The projection is used to enhance joining of framed electrode structures and framed cell elements to one another, and will be more fully described below.

In one embodiment, the frame is established around the thin sheet by being injection molded around it. This technique results in a simultaneous establishment of the frame around the thin sheet and a sealing of the frame to the thin sheet so as to render the resulting structure liquid impermeable. Optionally, the thin sheet may contain holes it it near its periphery so that when the frame is injection molded around the sheet, the dielectric plastic of the frame fills these holes so as to form continuous rivets.

In another embodiment, the frame is first formed by any fabrication technique, e.g. injection molding or stamping. The frame is formed so that its inner borders contain a ledge adapted to receive the thin sheet. By this method, the sheet is placed within the inner borders of the frame so as to rest on the ledge. The frame may be sealed to the thin sheet by ultrasonic or heat welding, or gluing techniques may be employed.

In addition to forming a plurality of bipolar carbon-plastic electrode structures as part of the method of the present invention of making a multicell electrochemical device, the formation of a plurality of electrochemical cell elements is included. These cell elements may be any of those typically included in bipolar cell devices, such as separators, spacers, membranes, supports, current collectors and the like, and may also include electrode structures. It is contemplated that some or all of the elements have dielectric plastic frames. More specifically, it is contemplated that a plurality of electrochemical cell elements be formed so as to have an electrochemical cell-functional center portion circumscribed by a dielectric plastic frame having a front surface and a back surface, at least one of these surfaces having a projection formed thereon. By "electrochemical cell-functional center portion" is meant that the cell element contains a center portion which performs some function in the cell, e.g. electrode, membrane, spacer, separator, current collector, etc. This does not mean that the frame itself might not also serve some such function, e.g. spacer. Also, the device of the present invention need not have all of its elements formed with dielectric frames. Thus, spacers or membranes or collectors, etc., may be smaller than the other elements and/or may be inserted or fitted or nested in other framed elements or electrode structures or in open frames. In any event, a plurality of cell elements are formed with the frame circumscribing the electrochemical cell-functional center portions, as described. These may be formed in a manner similar to any of those described above for the formation of the bipolar electrode structures.

In the method of the present invention, after the plurality of bipolar carbon-plastic electrode structures and of cell elements have been formed, they are all stacked with one another so as to form a group of items in an electrochemical cell-functional arrangement and in such a manner that the projection on the frame of each item contacts a frame surface of the next item in the stack (except, of course, the last item in the stack). By "electrochemical cell-functional arrangement" is meant that all of the items are arranged so that when appropriate electrolyte, catholyte and/or anolyte or other electrochemically active materials or structures are included therein, an operable electrochemical cell will result.

After the items are stacked in accordance with the above, each of the items are joined to one another by sealing each item to the next item in the stack at the point where its projection contacts the frame surface of the next item. This sealing is sufficiently established so as to form a continuous multicell electrochemical device capable of holding liquid therein.

In one embodiment, this joining is accomplished by using heat welding as the sealing technique. Advantageously, for this embodiment, the projections on the surfaces of the frames in the stack next to one another have flattened ends with these end surfaces adapted to totally contact the frame surface to which it is heat welded. This substantially enhances the heat welding joining step in the method.

In another embodiment, the joining is accomplished by using ultrasonic welding as the sealing technique. Advantageously, for this particular embodiment, the projections on the surfaces of the frames have pointed ends (tapered ends) so as to enhance the ultrasonic welding by directing ultrasonic vibratory energy toward the sharp point. This is especially useful when the surfaces of the frames with which these projections are in contact contain grooves for receiving the projections. In the method of the present invention, after the items are stacked in the above-mentioned arrangement, they are joined to one another by sealing, and more specifically by heat welding or ultrasonic welding, as described. Once the multicell electrochemical device has reached this point of fabrication, it is, as a device, completed. Of course, for ultimate use, perhaps electrolyte solutions and/or other materials may be added in order to obtain the desirable electrochemical activity. This might be accomplished, for example, by simply drilling fill holes in the plastic at desired locations, adding the fluid and capping the holes or permanently filling the holes. Alternatively, fill holes may be molded into selected frames or half the diameter of fill holes may be molded into selected frames so that, upon stacking, full diameter fill holes are obtained.

It should be clear that the electrochemical device of the present invention may ultimately be useful for many different types of systems. For example, with appropriate cell elements, dividers, spacers, inlet plumbing and the like, a fuel cell device or electrolyzer device might be made. Alternatively, and more desirably, the device may be used to obtain any of a great number of batteries. Thus, the bipolar electrodes may be coated with appropriate anodic and/or cathodic materials before assembly and usage, or after assembly, before or during usage. Resulting batteries would include, but not be limited to, the metal-halogen batteries, e.g., zinc-chlorine batteries, cadmium-halogen batteries, zinc-bromine batteries, the metal-acid batteries, e.g. lead, lead oxide ($H_2SO_4$), and others, such as nickel cadmium (KOH), as well as many others.

The present invention is further illustrated by the drawings. However, these are presented for illustrative purposes and the invention should not be construed to be limited thereto.

Figure 1:
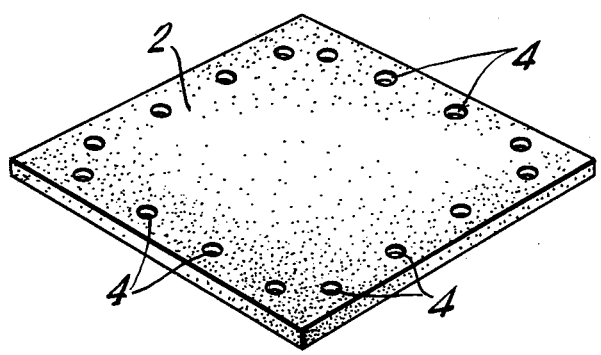
FIG. 1 shows a molded thin electrode sheet used in the present invention.

In FIG. 1, a thin conductive carbon-plastic electrode sheet is shown generally as 2. The sheet is made of 20% particulate conductive carbon sold under the name "Ketjenblack" and 80% plastic material based on the total weight of the carbon and plastic. The plastic consists of polypropylene-polyethylene copolymer (such as Hercules #8523 PM). The sheet is formed by extrusion molding to a thickness of about 0.008–0.015 inch, and holes for rivets, generally shown as 4 are drilled in the sheet.

Figure 2:
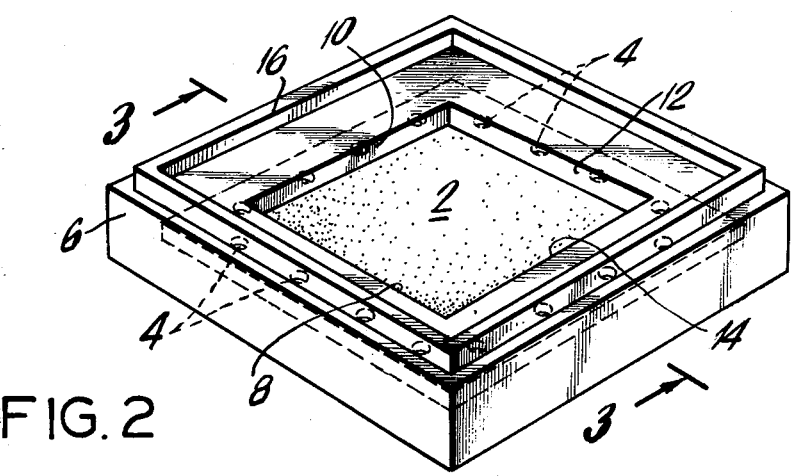
FIG. 2 shows the thin sheet of FIG. 1 with a dielectric plastic frame circumscribing it to form an electrode structure.

FIG. 2 shows the thin sheet 2 of FIG. 1 with a dielectric plastic frame 6 circumscribing it. The thin sheet 2 is located with the open center portion of the frame 6 defined by inner borders 8, 10, 12 and 14. Frame 6 has a front surface which faces the viewer and a back surface on the obverse. Frame 6 has a projection 16 on its front surface. In this embodiment, the frame 6 is injection molded around thin sheet 2 and plastic rivets are formed in the holes 4. These optional holes 4 and resulting rivets aid to insure structural strength and continuity to the resulting bipolar electrode structure.

Figure 3:
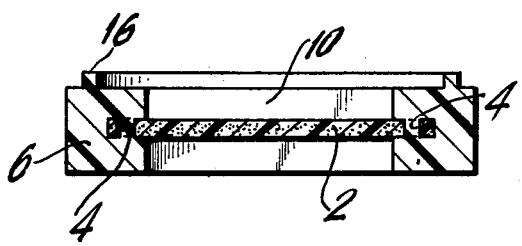
FIG. 3 shows the electrode structure of FIG. 2 from a cut view along 3—3.

FIG. 3 illustrates a cut version of the structure shown in FIG. 2, as taken along cut line 3—3 which cuts across holes 4. As shown, rivets are formed in holes 4. Projection 16 is also shown, as is inner border 10.

Figure 4:
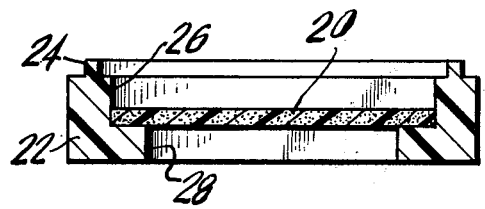
FIG. 4 shows a variation on the electrode structure wherein the frame contains a ledge.

FIG. 4 illustrates another embodiment of the present invention. The Figure shows a cut view of thin sheet 20 and frame 22. The frame 22 has inner borders such as border 26 which contains a ledge 28. Sheet 20 is inserted into the open central area of frame 22 and is rested on ledge 28. Frame 22 and sheet 20 are subsequently sealed by heat welding, ultrasonic welding or gluing, e.g. with epoxy.

While the structures shown in FIGS. 1 to 4 are square in shape, it should be recognized that any desired shape might be used, e.g. hexagonal, circular, rhomboidal, etc., as desired. Also, while only a single type of projection has been shown, these embodiments could include alternature projections such as are discussed below.

Figure 5:
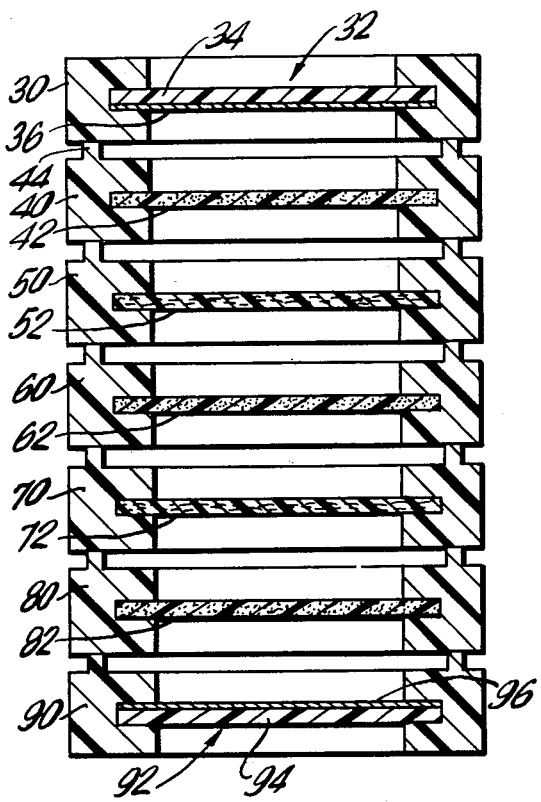
FIGS. 5 and 6 show a stack of electrode structures and other elements prior to and after being joined to one another.
Figure 6:
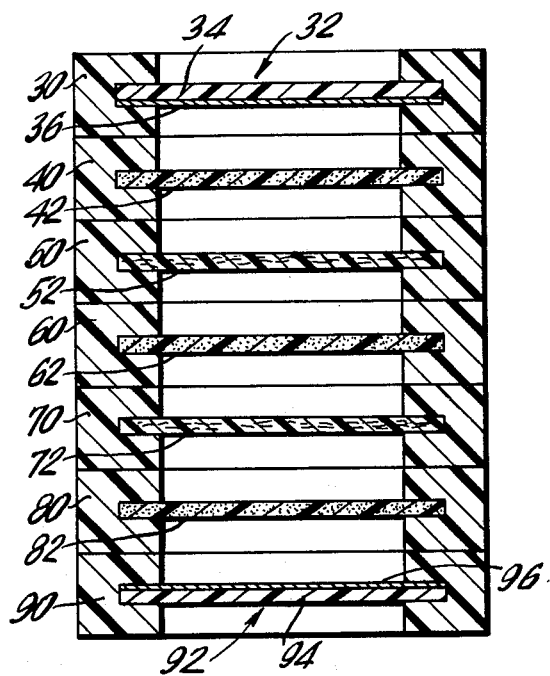

FIGS. 5 and 6 illustrate one embodiment of a stack of items (electrode structures and other cell elements) prior to and after being joined to one another. Frames 30 and 90 are circumscribed around electrochemical cell-functional center portions 32 and 92 respectively, by injection molding. These center portions 32 and 92 comprise metal current collectors 36 and 96, and dielectric plastic supports 34 and 94, respectively. The current collectors are designed to protrude outside the frames at one point each, for outside connection (not shown). Within the stack are three electrode structures having frames 40, 60 and 80 and bipolar conductive carbon-plastic thin sheets 42, 62 and 82, respectively. Also contained in the stack are other cell elements having frames 50 and 70 and center portions which are electrochemical cell membranes 52 and 72 made of suitable polymeric materials, e.g. either the ion-exchange or the micro-porous type. Each of the frames, except end frame 30, contains a projection as represented by projection 44 on frame 40. FIG. 5 shows the stack prior to its elements being heat sealed to one another. Upon heat sealing under pressure applied to the ends of the stack, the projections flatten out across the width of the frame surfaces and the resulting sealed electrochemical device, capable of retaining liquid, is shown in FIG. 6.

Figure 7:
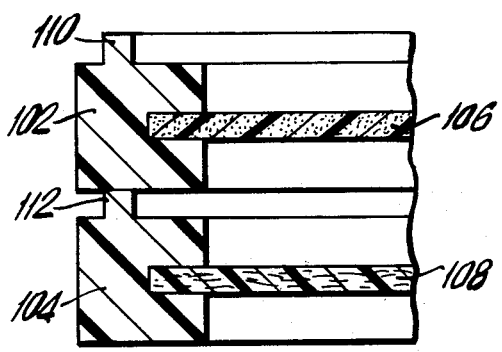
FIG. 7 illustrates an embodiment of a frame projection design particularly useful for heat welding.

FIG. 7 illustrates one technique for joining various items in a stack to one another. Frames 102 and 104 circumscribe thin sheets or other functional portions 106 and 108, respectively. Each frame has, on one of its surfaces, projections 110 and 112, respectively. As shown, the projections have flat surfaces and the projection on the front surface of one frame contacts the back surface of the next frame in the stack. The frames are joined together and sealed by heat welding at the projection.

Figure 8:
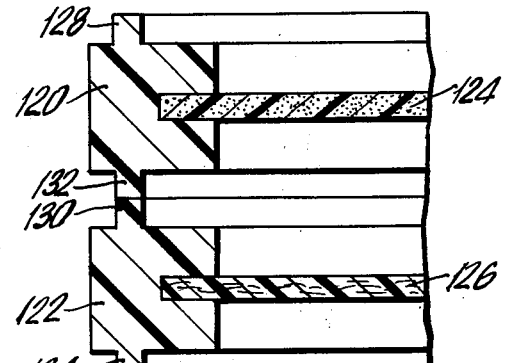
FIG. 8 illustrates another embodiment of a frame projection design particularly useful for heat welding.

FIG. 8 illustrates a variation on the type of frame projections shown in FIG. 7. In this embodiment, frames 120 and 122 circumscribe thin sheets or other elements 124 and 126, respectively. Each of frames 120 and 122 have flattened projections 128 and 130 on their front surfaces and flattened projections 132 and 134 on their back surfaces, respectively. The projection 130 on the front surface of frame 122 is in contact with the projection 132 on the back surface of frame 120. Heat welding is applied in the general areas of contact of the projections to join the items to one another.

Figure 9:
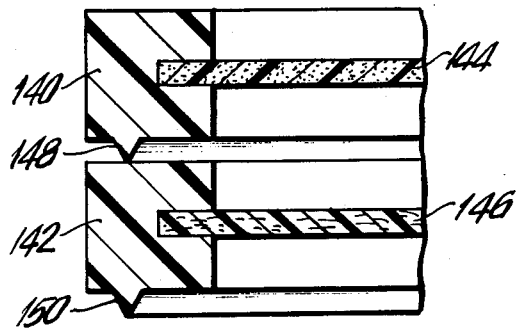
FIG. 9 illustrates an embodiment of a particular frame projection design particularly useful for ultrasonic welding.

FIG. 9 illustrates another technique for joining various items in a stack to one another. Frames 140 and 142 circumscribe electrochemical cell-functional portions 144 and 146, respectively. Each frame contains a pointed projection 148 and 150 which contacts the opposite surface of the next frame in the stack. Ultrasonic welding is applied in the general area of the projections and these projections enhance the welding apparently by directing the energy to their pointed ends.

Figure 10:
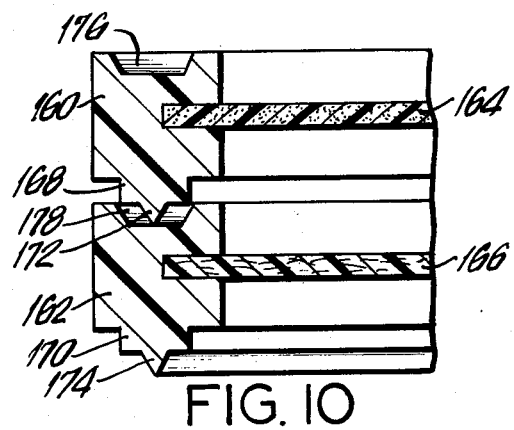
FIG. 10 illustrates another embodiment of a particular frame projection design particularly useful for ultrasonic welding.

FIG. 10 shows a variation of the pointed end projections shown in FIG. 9. In this embodiment, frames 160 and 162 circumscribe electrochemical cell-functional portions 164 and 166, respectively. Projections 168 and 170 have pointed ends 172 and 174 which are designed to fit loosely into grooves on the opposite surfaces of the frames with which they are in contact. These grooves are exemplified by grooves 176 and 178 in frames 160 and 162, respectively. Many variations in these concepts can now be seen which are within the purview of the present invention.

What is claimed is:

1. A multicell electrochemical device, comprising: a plurality of bipolar carbon-plastic electrode structures and a plurality of electrochemical cell elements, each of said structures and elements being circumscribed by a dielectric plastic frame having a front surface and a back surface, at least one surface of which contains a projection thereon, each of said structures and said elements being situated in a stacked arrangement with one another to form a group of items in an electrochemical cell-functional arrangement so that the projection of the frame of each item contacts a frame surface of the next item in the stack, each of said items being joined to the next item in the stack by being sealed where each projection contacts the frame surface of the next item, the items being sealed so as to form a continuous multicell electrochemical device having voids therein capable of holding liquid.

2. The device of claim 1 wherein the sealing has been accomplished by heat welding the projection of each item to the frame surface of the item with which it is in contact.

3. The structure of claim 2 wherein the projections have flattened ends with end surfaces adapted to contact the frame surface to which it has been heat welded.

4. The device of claim 3 wherein both the front and the back frame surfaces contain projections having flattened ends with end surfaces, each being adapted so as to contact an end surface of a projection on the item next to it in the stack, wherein the items are heat welded where these end surfaces contact one another.

5. The structure of claim 1 wherein the sealing has been accomplished by ultrasonically welding the projection of the frame of each item to the frame surface of the item with which it is in contact.

6. The structure of claim 5 wherein the projections have pointed ends adapted so as to enhance said ultrasonic welding.

7. The structure of claim 6 wherein each of the frames has said projection on one surface and has a groove on the other surface adapted so as to receive the pointed projection of the frame with which it is in contact.

* * * * *